United States Patent
Asida et al.

(10) Patent No.: US 6,754,052 B2
(45) Date of Patent: Jun. 22, 2004

(54) MAGNETORESISTIVE HEAD AND MANUFACTURING METHOD THEREFOR

(75) Inventors: Hiroshi Asida, Kawasaki (JP); Shin Eguchi, Kawasaki (JP); Atsushi Tanaka, Kawasaki (JP); Reiko Kondo, Kawasaki (JP); Yutaka Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 10/107,084

(22) Filed: Mar. 27, 2002

(65) Prior Publication Data

US 2003/0035251 A1 Feb. 20, 2003

(30) Foreign Application Priority Data

Aug. 15, 2001 (JP) ........................................ 2001-246695

(51) Int. Cl.[7] .............................................. G11B 5/127
(52) U.S. Cl. ....................................................... 360/322
(58) Field of Search .............................. 360/322, 324.2, 360/323, 327.3, 119, 324

(56) References Cited

U.S. PATENT DOCUMENTS

| | | | |
|---|---|---|---|
| 5,438,470 A | * | 8/1995 | Ravipati et al. |
| 5,668,688 A | * | 9/1997 | Dykes et al. |
| 5,731,937 A | | 3/1998 | Yuan |
| 6,134,089 A | | 10/2000 | Barr et al. ................... 360/322 |
| 6,381,107 B1 | | 4/2002 | Redon et al. ............. 360/324.2 |
| 6,574,079 B2 | * | 6/2003 | Sun et al. ................. 360/324.2 |
| 6,587,315 B1 | * | 7/2003 | Aoki et al. .................. 360/322 |
| 6,587,318 B2 | * | 7/2003 | Komuro et al. .......... 360/324.2 |

FOREIGN PATENT DOCUMENTS

JP 2001-6130 1/2001

* cited by examiner

*Primary Examiner*—Allen Cao
(74) *Attorney, Agent, or Firm*—Greer, Burns & Crain, Ltd.

(57) ABSTRACT

A magnetoresistive head including a first magnetic shield, a first electrode terminal provided on the first magnetic shield and having a first width, and a magnetoresistive film provided on the first electrode terminal and having a second width less than or equal to the first width. The magnetoresistive head further includes a second electrode terminal provided on the magnetoresistive film and having a third width less than or equal to the second width, and a second magnetic shield provided on the second electrode terminal. Preferably, the magnetoresistive head further includes a plug electrode for connecting the second electrode terminal to the second magnetic shield, and a plug side wall protective insulating film for covering a side wall of the plug electrode.

21 Claims, 20 Drawing Sheets

FIG. 1
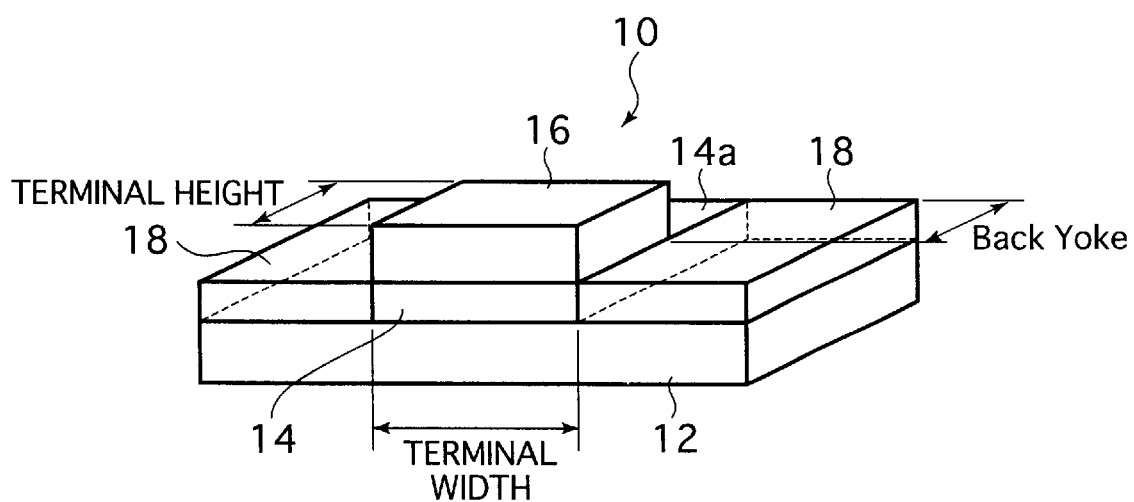
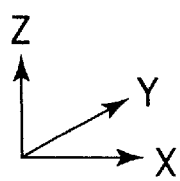

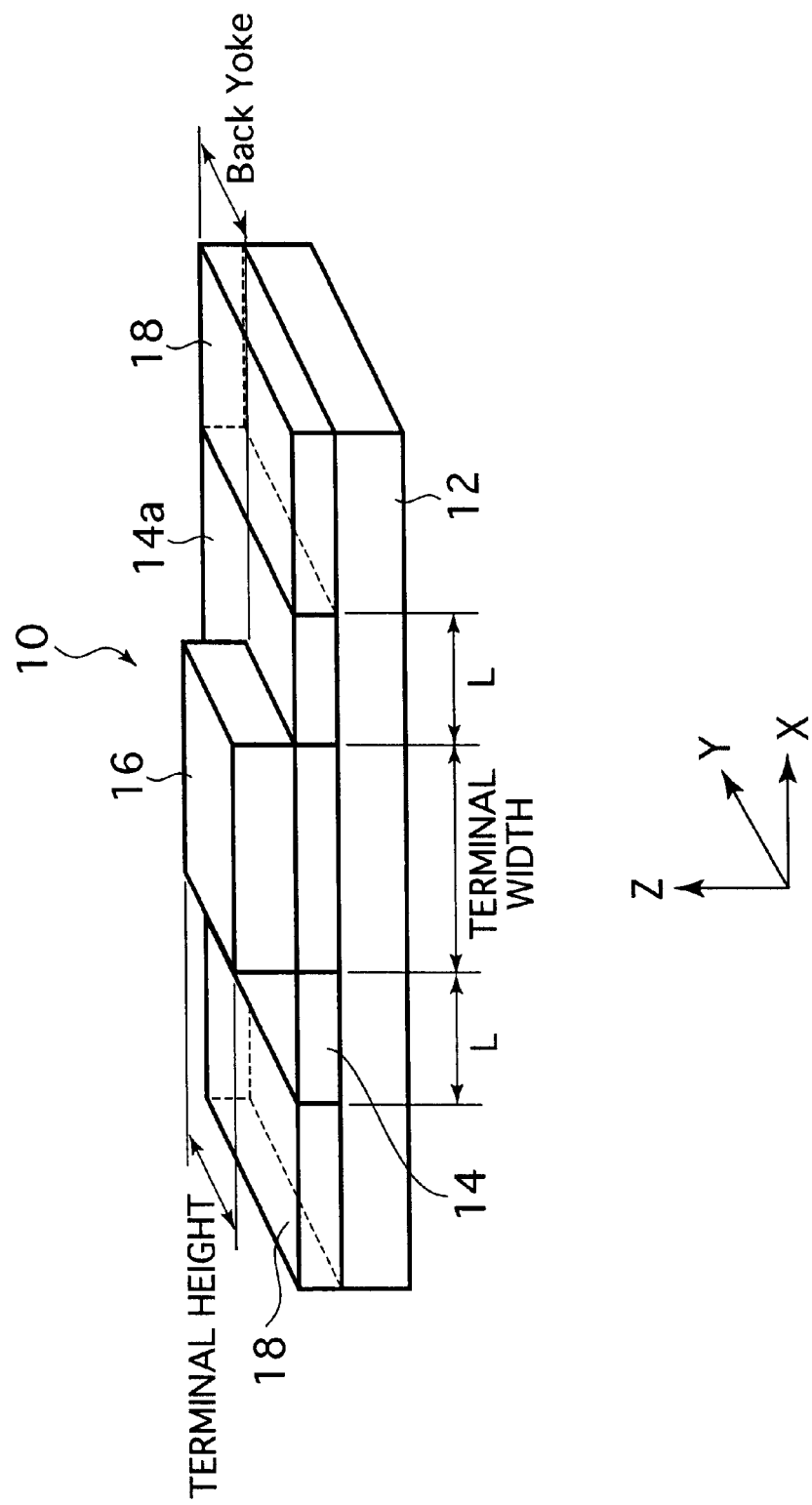

ELECTRODE TERMINAL
Cap
PdPtMn
PdPtMn
PdPtMn
CoFeB
Ru
CoFeB
Cu
NiFe
ELECTRODE TERMINAL

MAGNETORESISTIVE HEAD AND MANUFACTURING METHOD THEREFOR

BACKGROUND OF THE INVENTION

1. Field of the Invention

The present invention relates to a magnetoresistive head for use in a magnetic recording device such as a magnetic disk drive and a magnetic tape drive.

2. Description of the Related Art

In association with a reduction in size and an increase in recording density of a magnetic disk drive in recent years, the flying height of a head slider has become smaller and it has been desired to realize contact recording/reproduction such that the head slider flies a very small height above a recording medium or comes into contact with the recording medium. Further, a conventional magnetic induction head has a disadvantage such that its reproduction output decreases with a decrease in peripheral speed of a magnetic disk as the recording medium (relative speed between the head and the medium) caused by a reduction in diameter of the magnetic disk. To cope with this disadvantage, there has recently extensively been developed a magnetoresistive head (MR head) whose reproduction output does not depend on the peripheral speed and capable of obtaining a large output even at a low peripheral speed. Such a magnetoresistive head is now a dominating magnetic head. Further, a magnetic head utilizing a giant magnetoresistive (GMR) effect is also commercially available at present.

With higher-density recording in a magnetic disk drive, a recording area of one bit decreases and a magnetic field generated from the medium accordingly becomes smaller. The recording density of a magnetic disk drive currently on the market is about 10 Gbit/in2, and it is rising at an annual rate of about 200%. It is therefore desired to develop a magnetoresistive sensor and a magnetoresistive head which can support a minute magnetic field range and can sense a change in small external magnetic field.

At present, a spin valve magnetoresistive sensor utilizing a spin valve GMR effect is widely used in a magnetic head. In such a magnetoresistive sensor having a spin valve structure, a magnetization direction in a free ferromagnetic layer (free layer) is changed by a signal magnetic field from a recording medium, so that a relative angle of this magnetization direction to a magnetization direction in a pinned ferromagnetic layer (pinned layer) is changed, causing a change in resistance of the magnetoresistive sensor.

In the case of using this magnetoresistive sensor in a magnetic head, the magnetization direction in the pinned layer is fixed to a direction along the height of a magnetoresistive element, and the magnetization direction in the free layer in the condition where no external magnetic field is applied is generally designed to a direction along the width of the magnetoresistive element, the direction which is perpendicular to the pinned layer.

Accordingly, the resistance of the magnetoresistive sensor can be linearly increased or decreased according to whether the direction of the signal magnetic field from the magnetic recording medium is parallel or antiparallel to the magnetization direction of the pinned layer. Such a linear resistance change facilitates signal processing in the magnetic disk drive.

In the conventional magnetoresistive sensor, a sense current is passed in a direction parallel to the film surface of the magnetoresistive element to read a resistance change according to an external magnetic field. In such a case of a CIP (Current In the Plane) structure that a current is passed in a direction parallel to the GMR film surface, the output from the sensor decreases with a decrease in sense region defined by a pair of electrode terminals. Further, in the spin valve magnetoresistive sensor having the CIP structure, insulating films are required between the GMR film and an upper magnetic shield and between the GMR film and a lower magnetic shield.

That is, the distance between the upper and lower magnetic shields is equal to the sum of the thickness of the GMR film and a value twice the thickness of each insulating film. At present, the thickness of the insulating film is about 20 nm at the minimum. Accordingly, the distance between the upper and lower magnetic shields becomes equal to the sum of the thickness of the GMR film and about 40 nm.

However, with this distance, it is difficult to support a reduction in length of a recording bit on the recording medium, and the current CIP spin valve magnetoresistive sensor cannot meet the requirement that the distance between the magnetic shields is to be reduced to 40 nm or less. In these circumstances, it is considered that a magnetic head having a CIP structure utilizing a spin valve GMR effect can support a recording density of 20 to 40 Gbit/in$^2$ at the maximum. Even by applying specular scattering as a latest technique, the maximum recording density is considered to be 60 Gbit/in$^2$.

As mentioned above, the increase in recording density of a magnetic disk drive is rapid, and it is expected that a recording density of 80 Gbit/in$^2$ will be desired by 2002. When the recording density becomes 80 Gbit/in$^2$ or higher, it is very difficult to support such a high recording density even by using a CIP spin valve GMR magnetic head to which the latest specular scattering is applied, from the viewpoints of output and the distance between the magnetic shields. As a post spin valve GMR intended to cope with the above problem, there have been proposed a tunnel MR (TMR) and a GMR having a CPP (Current Perpendicular to the Plane) structure such that a current is passed in a direction perpendicular to the GMR film surface.

The TMR has a structure that a thin insulating layer is sandwiched between two ferromagnetic layers. The amount of a tunnel current passing across the insulating layer is changed according to the magnetization directions in the two ferromagnetic layers. The TMR shows a very large resistance change and has a good sensitivity, so that it is expected as a promising post spin valve GMR. On the other hand, in the case of the GMR having the CPP structure, the output increases with a decrease in sectional area of a portion of the GMR film where a sense current is passed. This feature of the CPP structure is a large advantage over the CIP structure.

The TMR is also considered to be a kind of CPP structure, because a current is passed across the insulating layer from one of the ferromagnetic layers to the other ferromagnetic layer. Therefore, the TMR also has the above advantage. For the purpose of higher sensitivity in the GMR having the CPP structure, it has been proposed to make the sizes of two electrode terminals sandwiching the GMR film smaller than the size of the GMR film (Japanese Patent Laid-open No. 10-55512).

In a manufacturing method for the magnetoresistive head described in the above publication, one of the two electrode terminals is first formed, the GMR film is next formed, and the other electrode terminal is next formed. However, in fabricating a microstructural GMR element at present, it is very difficult to make the sizes of the two electrode terminals smaller than the size of the GMR film and to suppress misalignment by adopting the above conventional manufacturing method.

In a conventional MR head manufacturing method (the term of MR in this specification including GMR), an MR head is manufactured by a contact hole process or a lift-off process. In the contact hole process, an MR film is formed into a desired shape, and a magnetic domain control film and an insulating film are next laminated. Thereafter, a contact hole is formed to electrically connect an upper electrode terminal and the MR film. In the lift-off process, a photoresist for patterning an MR film is left, and a magnetic domain control film and an insulating film are laminated. Thereafter, the photoresist is removed to thereby form a contact hole for electrically connecting an upper electrode terminal and the MR film.

The MR film at present has a width of about 0.1 μm. On the other hand, the photolithography technique at present has an error of about 0.06 μm. Accordingly, as the MR film becomes more microscopic, alignment of the MR film and the contact hole becomes difficult in the conventional contact hole process. On the other hand, the lift-off process also has a problem of defective contact or the like because a part of the photoresist remains after lift-off.

SUMMARY OF THE INVENTION

It is therefore an object of the present invention to provide a magnetoresistive head which can obtain a high reproduction output signal.

It is another object of the present invention to provide a magnetoresistive head manufacturing method which can manufacture such a magnetoresistive head easily at a high yield.

In accordance with an aspect of the present invention, there is provided a magnetoresistive head comprising a first magnetic shield; a first electrode terminal provided on said first magnetic shield, said first electrode terminal having a first width; a magnetoresistive film provided on said first electrode terminal, said magnetoresistive film having a second width less than or equal to said first width; a second electrode terminal provided on said magnetoresistive film, said second electrode terminal having a third width less than or equal to said second width; and a second magnetic shield provided on said second electrode terminal.

In accordance with another aspect of the present invention, there is provided a magnetoresistive head comprising a first magnetic shield; a first electrode terminal provided on said first magnetic shield, said first electrode terminal having a first height; a magnetoresistive film provided on said first electrode terminal, said magnetoresistive film having a second height less than or equal to said first height; a second electrode terminal provided on said magnetoresistive film, said second electrode terminal having a third height less than or equal to said second height; and a second magnetic shield provided on said second electrode terminal.

Preferably, a pair of magnetic domain control films are provided on the opposite sides of the magnetoresistive film, and the first magnetic shield is provided on a substrate. More preferably, the magnetoresistive head further comprises a plug electrode for connecting the second electrode terminal and the second magnetic shield, and a plug side wall protective insulating film for covering a side wall of the plug electrode.

In accordance with a further aspect of the present invention, there is provided a magnetoresistive head comprising a first electrode terminal serving also as a first magnetic shield, said first electrode terminal having a first width; a magnetoresistive film provided on said first electrode terminal, said magnetoresistive film having a second width less than or equal to said first width; a second electrode terminal provided on said magnetoresistive film, said second electrode terminal having a third width less than or equal to said second width; and a second magnetic shield provided on said second electrode terminal.

In accordance with a still further aspect of the present invention, there is provided a magnetoresistive head comprising a first electrode terminal serving also as a first magnetic shield, said first electrode terminal having a first height; a magnetoresistive film provided on said first electrode terminal, said magnetoresistive film having a second height less than or equal to said first height; a second electrode terminal provided on said magnetoresistive film, said second electrode terminal having a third height less than or equal to said second height; and a second magnetic shield provided on said second electrode terminal.

In accordance with a still further aspect of the present invention, there is provided a manufacturing method for a magnetoresistive head, comprising the steps of forming a first magnetic shield; forming a first electrode terminal on said first magnetic shield; forming a magnetoresistive film on said first electrode terminal; forming a first film for forming a second electrode terminal on said magnetoresistive film; forming a second film for forming a plug electrode on said first film; applying a photoresist to said second film; patterning said photoresist to a desired shape; etching said second film by using said patterned photoresist as a mask to form said plug electrode having a desired shape; removing said patterned photoresist and next depositing a first insulating film on said first film so as to cover said plug electrode; etching back said first insulating film by isotropic etching to form a first plug side wall protective insulating film for covering said plug electrode; etching said first film by ion milling by using said first plug side wall protective insulating film as a mask to form said second electrode terminal having a desired shape; depositing a second insulating film on said magnetoresistive film so as to cover said first plug side wall protective insulating film; etching back said second insulating film by isotropic etching to form a second plug side wall protective insulating film for covering said first plug side wall protective insulating film; and etching said magnetoresistive film into a desired shape by using said second plug side wall protective insulating film as a mask.

Preferably, the manufacturing method for the magnetoresistive head further comprises the steps of depositing a magnetic domain control film on said first electrode terminal so as to cover said second plug side wall protective insulating film after said step of etching said magnetoresistive film; etching back said magnetic domain control film by ion milling to obtain a desired shape and thickness; depositing an interlayer insulating film on said first electrode terminal and said magnetic domain control film; planarizing said interlayer insulating film; forming a through hole for said first electrode terminal in said interlayer insulating film; and forming a second magnetic shield on said interlayer insulating film so that said second electrode terminal is connected through said plug electrode to said second magnetic shield, and said first electrode terminal is connected directly to said second magnetic shield in said through hole. Thus, the second electrode terminal is connected through the plug electrode to the second magnetic shield, and the first electrode terminal is connected directly to the second magnetic shield in the through hole.

In the magnetoresistive head of the present invention, the height or width of the first electrode terminal can be made larger than the height or width of the magnetoresistive film. Accordingly, there is almost no need for alignment of the first electrode terminal and the second electrode terminal and for alignment of the first electrode terminal and the magnetoresistive film, thereby facilitating the fabrication of the magnetoresistive head.

Although the height or width of the first electrode terminal is set larger than the height or width of the magnetoresistive film, there is no effect on reproduction characteristics. Further, in the case that the height or width of the first electrode terminal is equal to the height or width of the magnetoresistive film, the first electrode terminal and the magnetoresistive film can be formed simultaneously, thereby facilitating the fabrication of the magnetoresistive head. In the case that the height or width of the second electrode terminal is less than the height or width of the magnetoresistive film, the sectional area of a portion of the magnetoresistive film where a sense current flows can be reduced, thereby obtaining a high reproduction output in view of the characteristics of a CPP structure.

In the case that the height or width of the second electrode terminal is equal to the height or width of the magnetoresistive film, the second electrode terminal and the magnetoresistive film can be formed simultaneously, thereby facilitating the fabrication of the magnetoresistive head. Further, in the case that the height or width of the second electrode terminal is less than the height or width of the magnetoresistive film, self-alignment can be effected by a process technique such as photoresist shrinkage, so that alignment of the second electrode terminal and the magnetoresistive film is not required, thereby facilitating the fabrication of the magnetoresistive head.

In the structure that the height or width of only the second electrode terminal is less than the height or width of the magnetoresistive film according to the present invention as compared with the conventional structure disclosed in Japanese Patent Laid-open No. 10-55512 that both the first and second electrode terminals are smaller in size than the magnetoresistive film, higher current concentration occurs to thereby obtain a similar or higher reproduction output.

Accordingly, also in forming a microstructural magnetoresistive element supporting a high recording density, alignment of the two electrode terminals sandwiching the magnetoresistive film is not required, thereby facilitating the fabrication of the magnetoresistive element. Further, the magnetoresistive element can be manufactured at a high yield, and a high reproduction output signal with no Barkhausen noise can be obtained.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 1 is a schematic perspective view of a magnetoresistive head according to a first preferred embodiment of the present invention;

FIG. 9 is a schematic perspective view of a magnetoresistive head according to a second preferred embodiment of the present invention;

DETAILED DESCRIPTION OF THE PREFERRED EMBODIMENTS

Figure 2A:
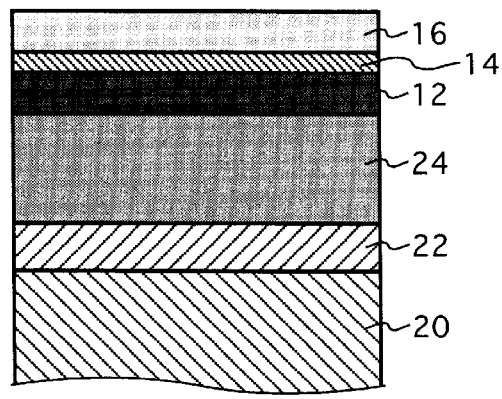
FIGS. 2A to 2C are views showing a manufacturing process for the magnetoresistive head according to the first preferred embodiment.

Some preferred embodiments of the present invention will now be described with reference to the drawings. In the following description of the preferred embodiments, substantially the same parts are denoted by the same reference numerals. Referring to FIG. 1, there is shown a schematic perspective view of a magnetoresistive head 10 according to a first preferred embodiment of the present invention. In FIG. 1, upper and lower magnetic shields are not shown. Reference numeral 12 denotes a lower electrode terminal formed of Cu or the combination of Cu and Au. The lower electrode terminal 12 has a first width in the X direction shown in FIG. 1 and a first height in the Y direction shown in FIG. 1.

A magnetoresistive film (MR film) 14 is formed on the lower electrode terminal 12. The MR film 14 has a second width smaller than the first width in the X direction and a height equal to the first height in the Y direction. A pair of magnetic domain control films 18 are formed on the lower electrode terminal 12 so as to interpose the MR film 14 in the X direction. The magnetic domain control films 18 may be provided by a high-coercivity film such as a CoCrPt film or by an antiferromagnetic film such as a PdPtMn film. An upper electrode terminal 16 is formed on the MR film 14. The upper electrode terminal 16 is formed of Cu or the combination of Cu and Au. The upper electrode terminal 16 has a width equal to the second width in the X direction and a second height smaller than the first height in the Y direction. A portion 14a of the MR film 14 not covered with the upper electrode terminal 16 functions as a back yoke for guiding a magnetic flux.

In the magnetoresistive head 10 according to the first preferred embodiment, the width of the upper electrode terminal 16 is the same as the width of the MR film 14, and the width of the lower electrode terminal 12 is larger than the width of the MR film 14. Accordingly, current concentration of a sense current occurs in the vicinity of opposite side portions of the MR film 14, so that the sectional area of a sense region of the MR film 14 where the sense current flows can be reduced. As a result, a high reproduction output can be obtained. The MR film 14 includes at least one low-resistance film and at least two ferromagnetic films sandwiching the low-resistance film. Alternatively, the MR film 14 has a ferromagnetic tunnel junction structure or a multilayer film structure including a ferromagnetic layer and a nonmagnetic layer. In other words, the MR film 14 may be provided by a spin valve GMR film such as a NiFe/Cu/NiFe/IrMn multilayer film, a laminated ferri spin valve GMR film such as a NiFe/Cu/CoFeB/Ru/CoFeB/PdPtMn multilayer film, or a tunnel junction type MR film (TMR film) such as a NiFe/Al$_2$O$_3$/NiFe/PdPtMn multilayer film.

A manufacturing process for the magnetoresistive head 10 according to the first preferred embodiment will now be described with reference to FIGS. 2A to 8C. FIGS. 2A, 3A, 4A, 5A, 6A, 7A, and 8A are cross sections taken along the height of the MR element (in the Y direction) at the center of the terminal width, FIGS. 2B, 3B, 4B, 5B, 6B, 7B, and 8B are cross sections taken along the width of the MR element (in the X direction, i.e., along the track width) at the center of the terminal width. FIGS. 2C, 3C, 4C, 5C, 6C, 7C, and 8C are top plan views of FIGS. 2B, 3B, 4B, 5B, 6B, 7B, and 8B, respectively.

Figure 2B:
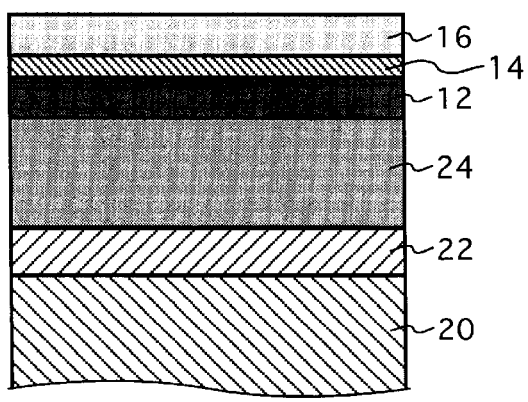
Figure 2C:
Figure 3A:
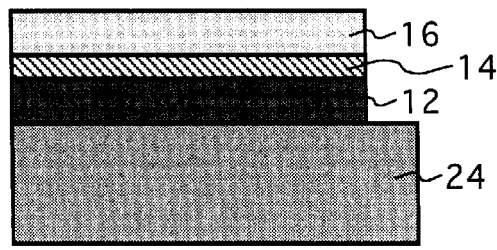
FIGS. 3A to 3C are views showing a manufacturing process for the magnetoresistive head according to the first preferred embodiment.
Figure 3B:
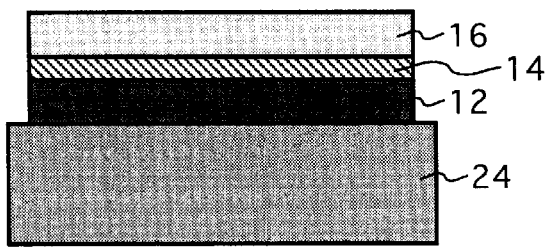
Figure 3C:
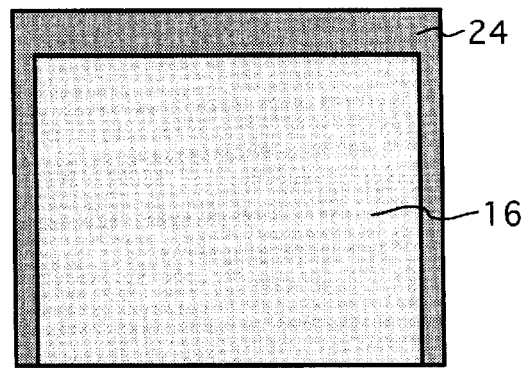

As shown in FIGS. 2A to 2B, a base layer 22 of Al$_2$O$_3$, a lower magnetic shield 24 of NiFe, a lower electrode terminal 12, an MR film 14, and an upper electrode terminal 16 are sequentially formed on an Al$_2$O$_3$—TiC substrate 20. As shown in FIGS. 3A to 3C, the lower electrode terminal 12, the MR film 14, and the upper electrode terminal 16 are patterned to a desired shape. A photoresist 26 is uniformly applied and next patterned to a desired shape. At this time, the height of the photoresist 26 (the length in the Y direction) may be smaller than that of the upper electrode terminal 16 as shown by the dashed line in FIG. 4A.

The upper electrode terminal 16, the MR film 14, and the lower electrode terminal 12 are partially etched by ion milling or the like by using the photoresist 26 as a mask. At this time, the etching of the films 16, 14, and 12 is preferably performed so that the level of the upper surface of a magnetic domain control film 18 to be formed later becomes lower than or equal to the level of the lower surface of the upper electrode terminal 16. The etching of the lower electrode terminal 12 may be omitted provided that the level of the upper surface of the magnetic domain control film 18 is lower than or equal to the level of the lower surface of the upper electrode terminal 16. In the case that the height of the photoresist 26 is small as shown by the dashed line in FIG. 4A, the height of the MR film 14 may be smaller than that of the lower electrode terminal 12 in the Y direction.

Figure 4A:
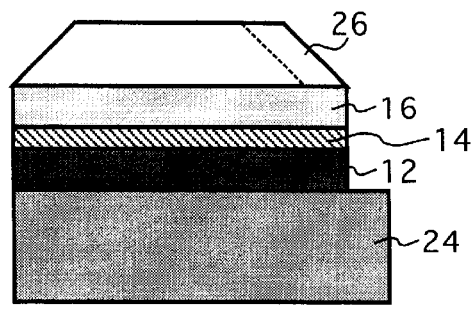
FIGS. 4A to 4C are views showing a manufacturing process for the magnetoresistive head according to the first preferred embodiment.
Figure 4B:
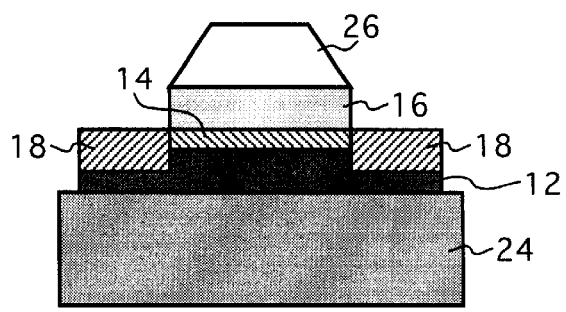
Figure 4C:
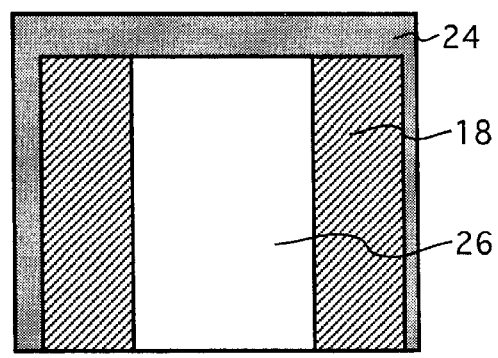

As shown in FIGS. 4A to 4C, the magnetic domain control film 18 is formed without removing the photoresist 26. The magnetic domain control film 18 may be provided by a high-coercivity film such as a CoCrPt film or by an antiferromagnetic film such as a PdPtMn film. The photoresist 26 is next patterned to a desired shape. At this time, the width of the photoresist 26 is set equal to or smaller than the width of the upper electrode terminal 16 in the X direction. The upper electrode terminal 16 is next etched by ion milling or the like by using the photoresist 26 as a mask.

Figure 5A:
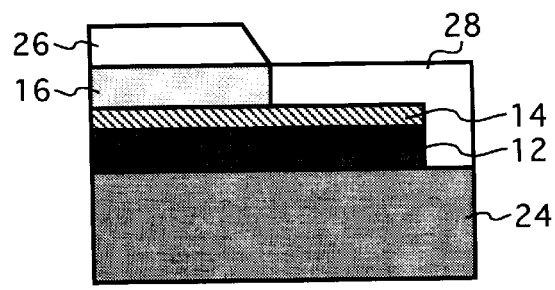
FIGS. 5A to 5C are views showing a manufacturing process for the magnetoresistive head according to the first preferred embodiment.
Figure 5B:
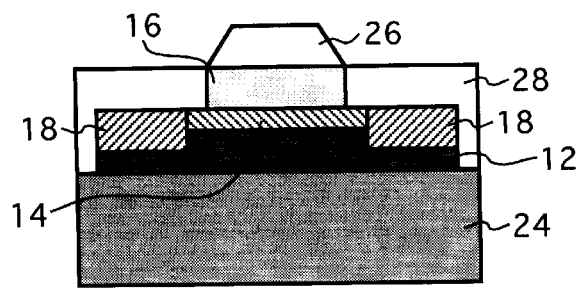
Figure 5C:
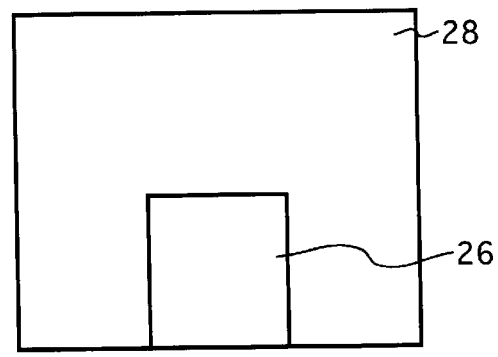
Figure 7A:
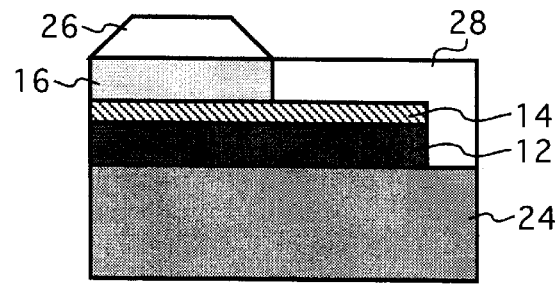
FIGS. 7A to 7C are views showing a manufacturing process for the magnetoresistive head according to the first preferred embodiment.
Figure 7B:
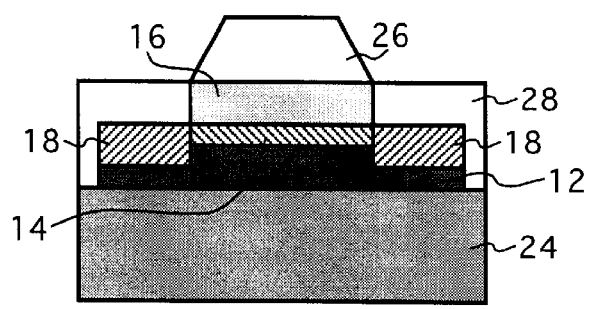
Figure 7C:
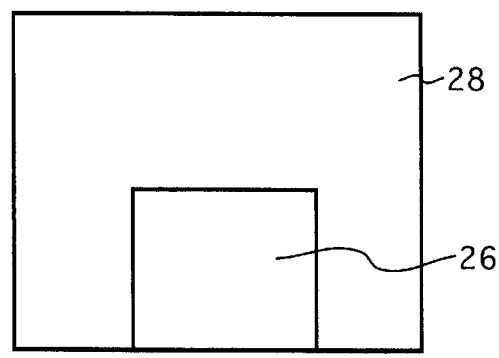

In the case that the width of the photoresist 26 is smaller than that of the upper electrode terminal 16 as shown in FIG. 5B, the width of the upper electrode terminal 16 becomes smaller than that of the MR film 14. However, this structure has not so large influence on reproducing characteristics, or rather improves the resolution along the track width to thereby obtain good reproducing characteristics. Thereafter, an insulating film 28 is formed as shown in FIGS. 5A to 5C. In the case that the width of the photoresist 26 is equal to that of the upper electrode terminal 16, the upper electrode terminal 16 is etched as shown in FIGS. 7A to 7C.

Figure 6A:
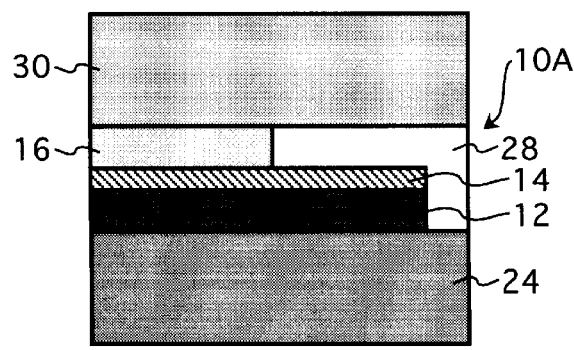
FIGS. 6A to 6C are views showing a manufacturing process for the magnetoresistive head according to the first preferred embodiment.
Figure 6B:
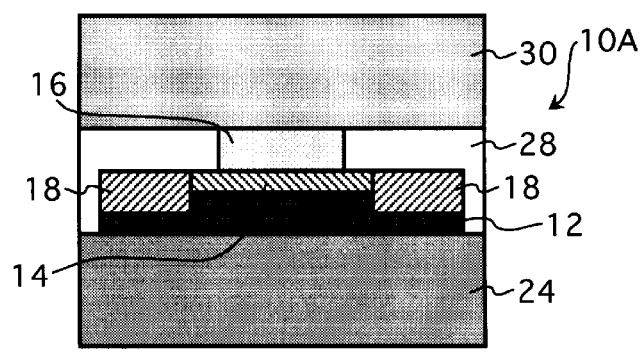
Figure 6C:
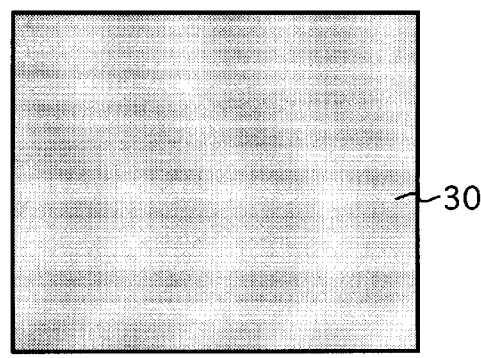
Figure 8A:
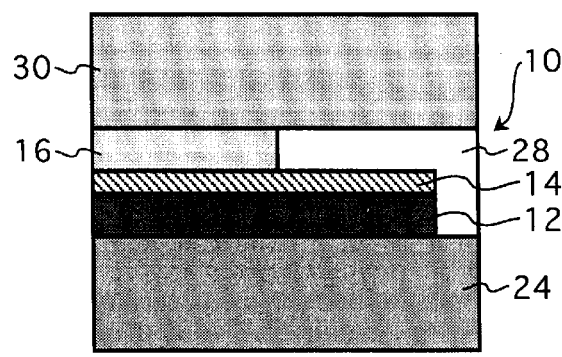
FIGS. 8A to 8C are views showing a manufacturing process for the magnetoresistive head according to the first preferred embodiment.
Figure 8B:
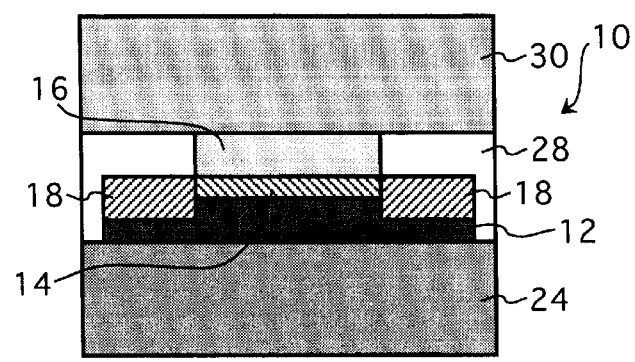
Figure 8C:
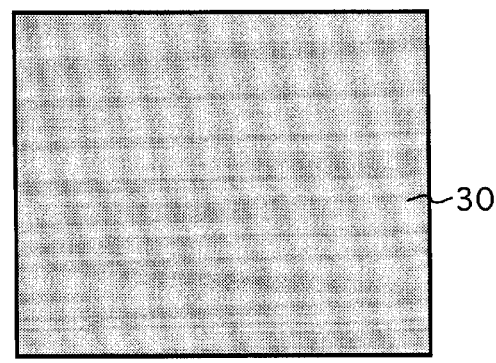

After the step shown in FIGS. 5A to 5C, the photoresist 26 is removed and an upper magnetic shield 30 of NiFe is formed as shown in FIGS. 6A to 6C. In the case that the width of the photoresist 26 is smaller than that of the upper electrode terminal 16 as shown in FIG. 5B, a magnetoresistive head 10A as a modification of the first preferred embodiment is obtained as shown in FIGS. 6A to 6C. On the other hand, in the case that the width of the photoresist 26 is equal to that of the upper electrode terminal 16 as shown in FIG. 7B, the magnetoresistive head 10 of the first preferred embodiment is obtained as shown in FIGS. 8A to 8C. The magnetic shields 24 and 30 and the electrode terminals 12 and 16 are formed by plating or vapor deposition, and the MR film 14, the magnetic domain control film 18, and the insulating film 28 are formed by sputtering, for example.

According to the magnetoresistive head 10 of the first preferred embodiment or the modification 10A thereof manufactured by the above-mentioned process, high-sensitivity head reproducing characteristics can be obtained irrespective of misalignment of the upper and lower electrode terminals along the track width.

Referring to FIG. 9, there is shown a schematic perspective view of a magnetoresistive head 10B according to a second preferred embodiment of the present invention. In FIG. 9, upper and lower magnetic shields are not shown. Reference numeral 12 denotes a lower electrode terminal. The lower electrode terminal 12 has a first width in the X direction shown in FIG. 9 and a first height in the Y direction shown in FIG. 9. An MR film 14 is formed on the lower electrode terminal 12. The MR film 14 has a second width smaller than the first width in the X direction and a height equal to the first height in the Y direction. A pair of magnetic domain control films 18 are formed on the lower electrode terminal 12 so as to interpose the MR film 14 in the X direction.

An upper electrode terminal 16 is formed on the MR film 14. The upper electrode terminal 16 has a third width smaller than the second width in the X direction and a second height smaller than the first height in the Y direction. That is, the width of the MR film 14 is larger than the width of the upper electrode terminal 16 by 2L where L is the length of a projection from each side of the upper electrode terminal 16. Like the first preferred embodiment, a portion 14a of the MR film 14 not covered with the upper electrode terminal 16 functions as a back yoke for guiding a magnetic flux. In the magnetoresistive head 10B according to the second preferred embodiment, the configuration of the MR film 14 may be made similar to that of the first preferred embodiment.

A manufacturing process for the magnetoresistive head 10B according to the second preferred embodiment will now be described with reference to FIGS. 10A to 15C. FIGS. 10A, 11A, 12A, 13A, 14A, and 15A are cross sections taken along the height of the MR element (in the Y direction) at the center of the terminal width, FIGS. 10B, 11B, 12B, 13B, 14B, and 15B are cross sections taken along the width of the MR element (in the X direction, i.e., along the track width) at the center of the terminal width. FIGS. 10C, 11C, 12C, 13C, 14C, and 15C are top plan views of FIGS. 10B, 11B, 12B, 13B, 14B, and 15B, respectively.

Figure 10A:
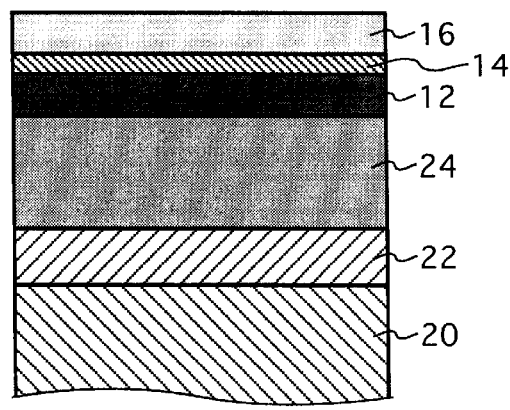
FIGS. 10A to 10C are views showing a manufacturing process for the magnetoresistive head according to the second preferred embodiment.
Figure 10B:
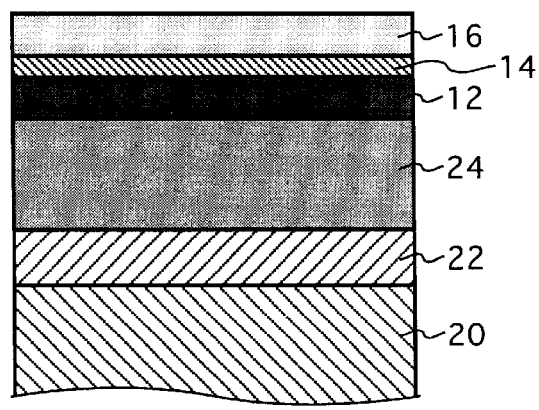
Figure 10C:
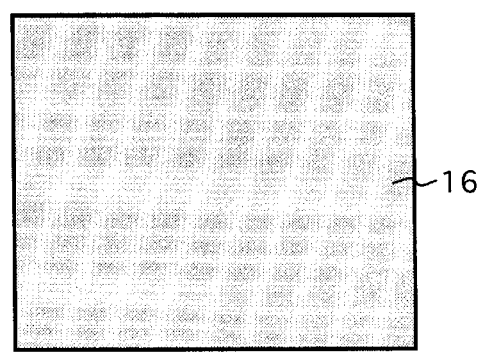
Figure 11A:
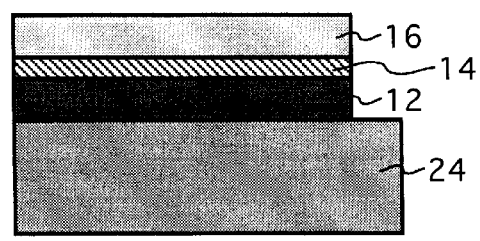
FIGS. 11A to 11C are views showing a manufacturing process for the magnetoresistive head according to the second preferred embodiment.
Figure 11B:
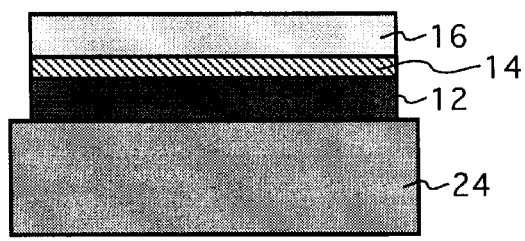
Figure 11C:
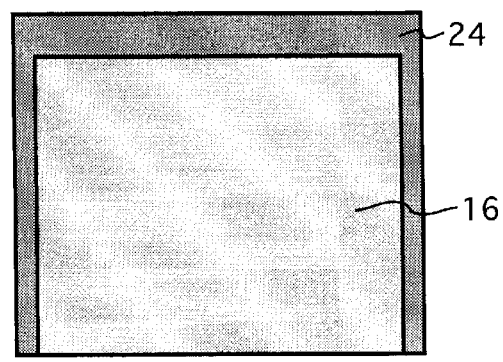

As shown in FIGS. 10A to 10C, a base layer 22 of $Al_2O_3$, a lower magnetic shield 24 of NiFe, a lower electrode terminal 12, an MR film 14, and an upper electrode terminal 16 are sequentially formed on an $Al_2O_3$—TiC substrate 20. As shown in FIGS. 11A to 11C, the lower electrode terminal 12, the MR film 14, and the upper electrode terminal 16 are patterned to a desired shape. A photoresist 26 is uniformly applied and next patterned to a desired shape. At this time, the height of the photoresist 26 (the length in the Y direction) may be smaller than that of the upper electrode terminal 16 as shown by the dashed line in FIG. 12A.

The upper electrode terminal 16, the MR film 14, and the lower electrode terminal 12 are partially etched by ion milling or the like by using the photoresist 26 as a mask. At this time, the etching of the films 16, 14, and 12 is preferably performed so that the level of the upper surface of a magnetic domain control film 18 to be formed later becomes lower than or equal to the level of the lower surface of the upper electrode terminal 16. The etching of the lower electrode terminal 12 may be omitted provided that the level of the upper surface of the magnetic domain control film 18 is lower than or equal to the level of the lower surface of the upper electrode terminal 16. In the case that the height of the photoresist 26 is small as shown by the dashed line in FIG. 12A, the height of the MR film 14 may be smaller than that of the lower electrode terminal 12 in the Y direction.

Figure 12A:
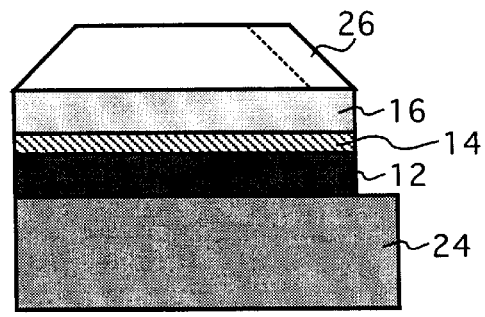
FIGS. 12A to 12C are views showing a manufacturing process for the magnetoresistive head according to the second preferred embodiment.
Figure 12B:
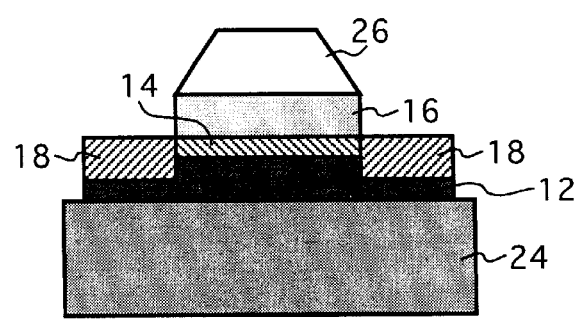
Figure 12C:
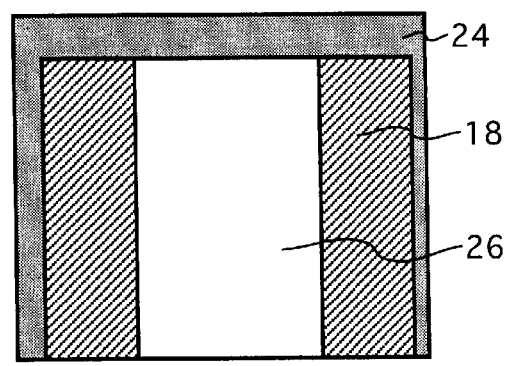
Figure 13A:
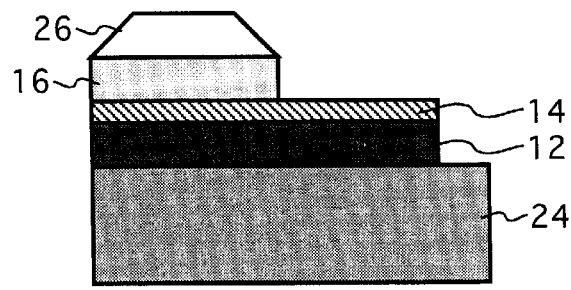
FIGS. 13A to 13C are views showing a manufacturing process for the magnetoresistive head according to the second preferred embodiment.
Figure 13B:
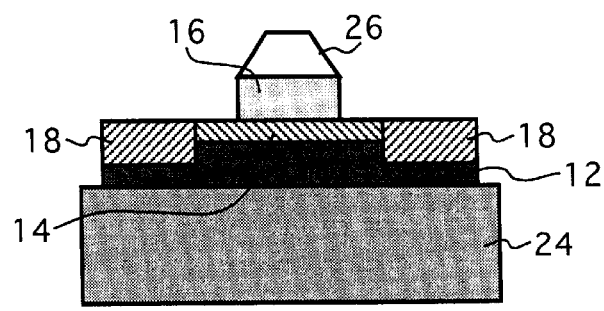
Figure 13C:
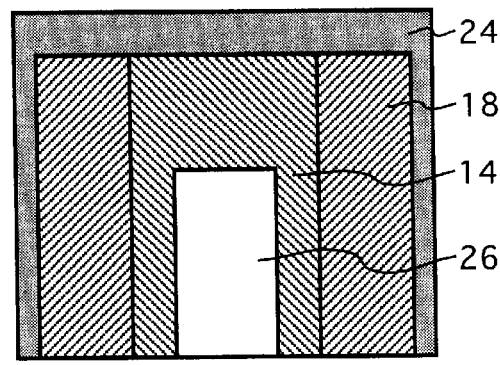

As shown in FIGS. 12A to 12C, the magnetic domain control film 18 is formed without removing the photoresist 26. The magnetic domain control film 18 may be provided by a high-coercivity film such as a CoCrPt film or by an antiferromagnetic film such as a PdPtMn film. The photoresist 26 is next patterned to a desired shape. The upper electrode terminal 16 is next etched by ion milling or the like by using the photoresist 26 as a mask. In the case that it is difficult to align the MR film 14 and the upper electrode terminal 16 in the step of FIGS. 13A to 13C, the photoresist 26 in the step of FIGS. 12A to 12C may be shrunk by heat or the like by a desired length before etching the upper electrode terminal 16. After etching the upper electrode terminal 16, a photoresist may be formed again to etch the upper electrode terminal 16 in the Y direction only.

Figure 14A:
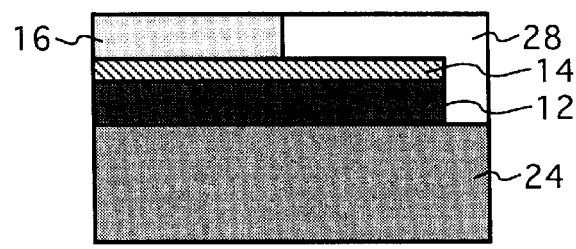
FIGS. 14A to 14C are views showing a manufacturing process for the magnetoresistive head according to the second preferred embodiment.
Figure 14B:
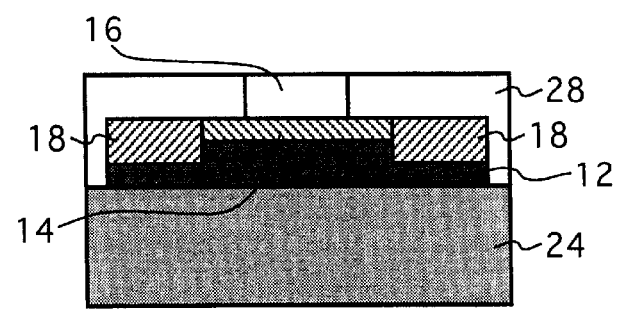
Figure 14C:
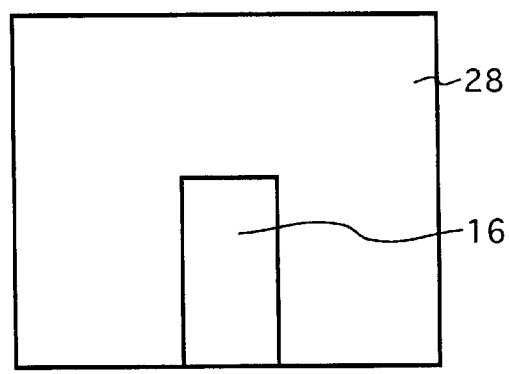
Figure 15A:
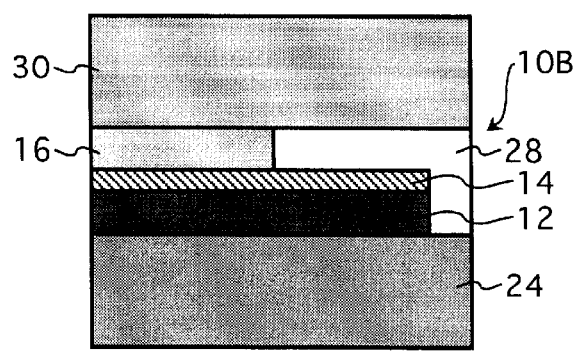
FIGS. 15A to 15C are views showing a manufacturing process for the magnetoresistive head according to the second preferred embodiment.
Figure 15B:
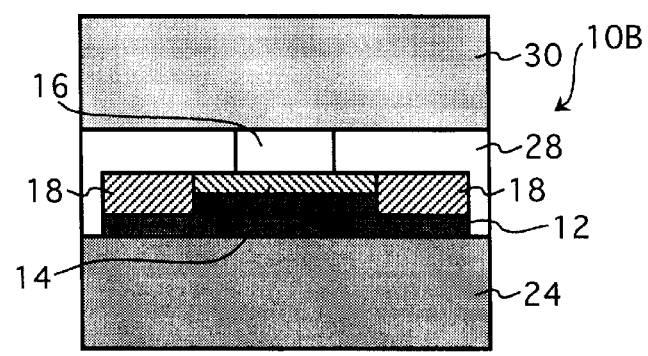
Figure 15C:
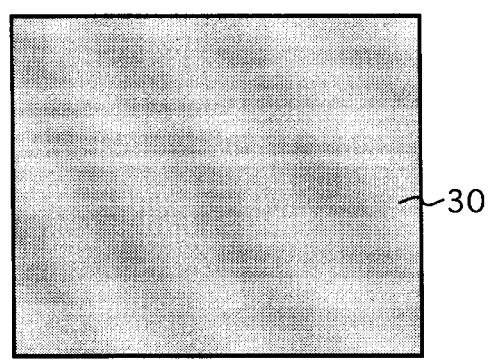

Thereafter, an insulating film 28 is formed without removing the photoresist 26, and the photoresist 26 is next removed as shown in FIGS. 14A to 14C. Thereafter, an upper magnetic shield 30 is formed as shown in FIGS. 15A to 15C to obtain the magnetoresistive head 10B according to the second preferred embodiment. The magnetic shields 24 and 30 and the electrode terminals 12 and 16 are formed by plating or vapor deposition, and the MR film 14, the magnetic domain control film 18, and the insulating film 28 are formed by sputtering, for example.

According to the magnetoresistive head 10B of the second preferred embodiment manufactured by the above-mentioned process, high-sensitivity head reproducing characteristics can be obtained irrespective of misalignment of the upper and lower electrode terminals along the track width.

Figure 16A:
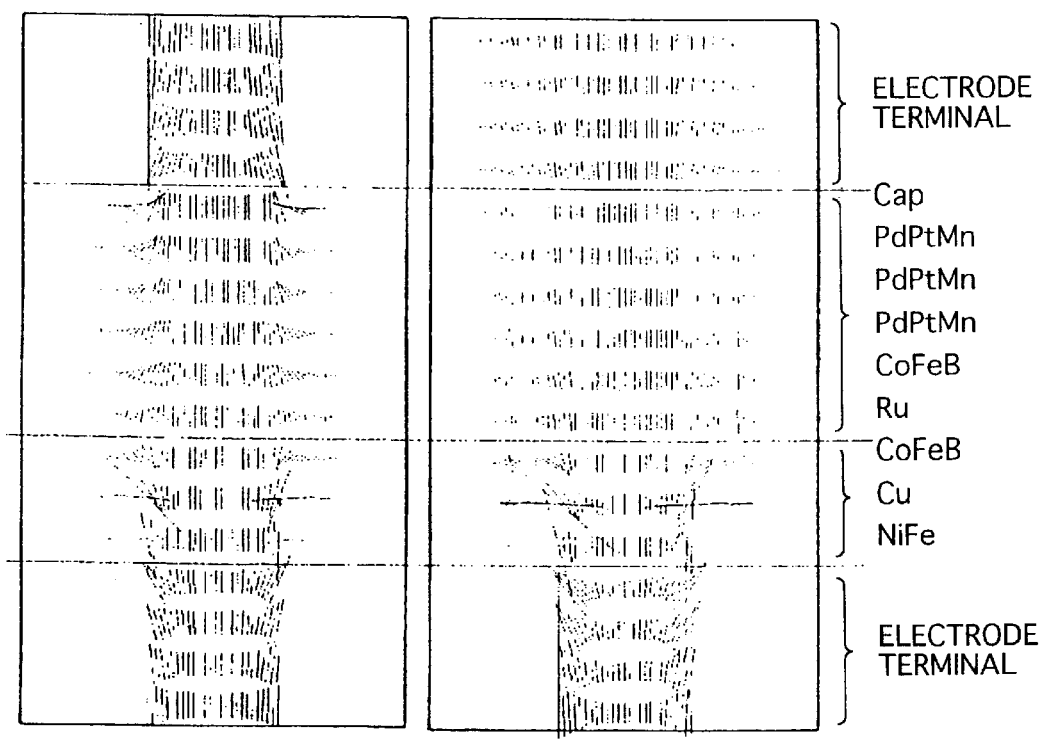
FIGS. 16A and 16B are illustrations of current distribution by computer simulation.
Figure 16B:
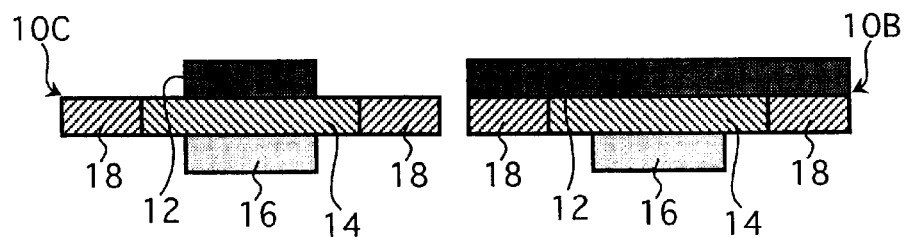

FIGS. 16A and 16B are current distribution charts by computer simulation, showing the effect of the present invention in comparison with the prior art. More specifically, FIG. 16A shows a magnetoresistive head 10C having a structure that upper and lower electrode terminals are smaller in width than an MR film as described in Japanese Patent Laid-open No. 10-55512, and FIG. 16B shows the magnetoresistive head 10B according to the second preferred embodiment of the present invention. The configuration of the MR film 14 in each of FIGS. 16A and 16B is of a laminated ferri type composed of NiFe/Cu/CoFeB/Ru/CoFeB/PdPtMn/Cap. The terminal height and terminal width of the upper electrode terminal 16 are 0.2 μm and 0.13 μm, respectively, and the length L shown in FIG. 9 is 0.04 μm.

In comparing the current distributions shown in FIGS. 16A and 16B, the current distribution in the free layer/Cu/the pinned layer having an effect on the reproducing characteristics, i.e., the NiFe/Cu/CoFeB layers shown in FIG. 16A is substantially the same as that shown in FIG. 16B. Magnetization distribution was calculated by micromagnetics simulation at a recording density of about 80 Gbit/inch$^2$, and next multiplied by the above current distribution to thereby perform off-track profile calculation (the half width in the off-track profile was adopted as an effective read core width) and isolated reproduction waveform calculation (the peak-to-peak distance in this waveform was adopted as a reproduction output).

In the prior art structure shown in FIG. 16A, the effective read core width and the reproduction output were 0.164 μm and 1530 μV, respectively. On the other hand, in the structure according to the present invention shown in FIG. 16B, the effective read core width and the reproduction output were 0.169 μm and 2000 μV, respectively. These results show that the effective read core width in the structure according to the present invention is substantially the same as that in the prior art structure, but the reproduction output in the structure according to the present invention is remarkably higher than that in the prior art structure, thus confirming the effect of the present invention.

Figure 17:
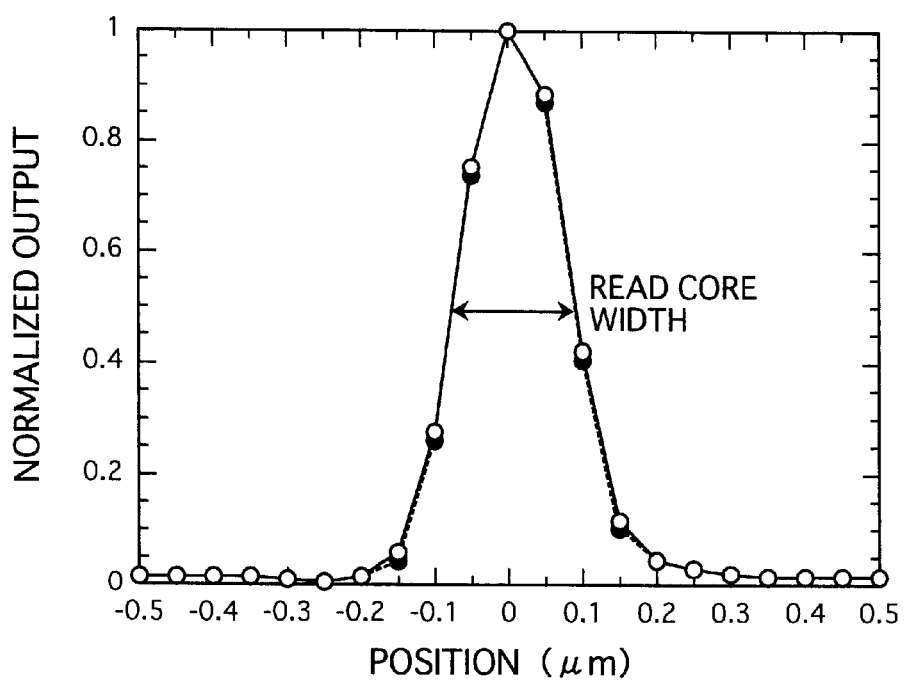
FIG. 17 is a graph showing an off-track profile.

FIG. 17 shows the off-track profiles in the structures shown in FIGS. 16A and 16B. In FIG. 17, the horizontal axis represents position along the width of the MR element, and the vertical axis represents normalized output. In the graph shown in FIG. 17, the closed circles or black dots correspond to the prior art structure, and the open circles or white dots correspond to the structure according to the second preferred embodiment of the present invention.

Figure 18A:
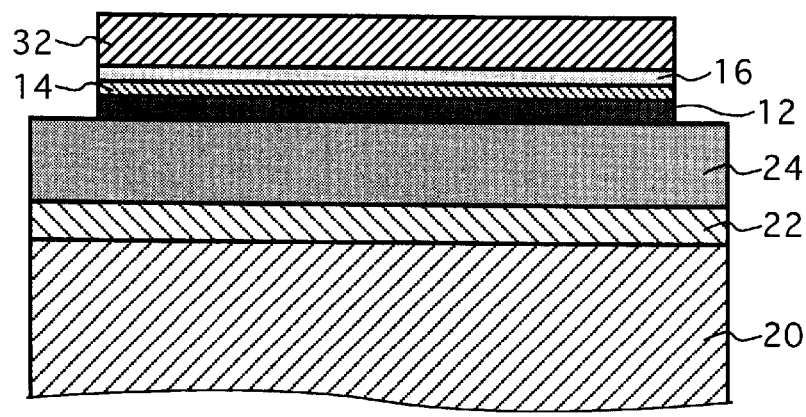
FIGS. 18A to 18C are sectional views showing a manufacturing process for a magnetoresistive head according to a third preferred embodiment of the present invention.

A manufacturing process for a magnetoresistive head 10D according to a third preferred embodiment of the present invention will now be described with reference to FIGS. 18A to 20C. As shown in FIG. 18A, a base layer 22 of $Al_2O_3$, a lower magnetic shield 24 of NiFe, a lower electrode terminal 12, an MR film 14, an upper electrode terminal 16, and a plug electrode film 32 are sequentially formed on an $Al_2O_3$—TiC substrate 20. The MR film 14 may be provided by a spin valve GMR film such as a NiFe/Cu/NiFe/IrMn multilayer film, a laminated ferri spin valve GMR film such as a NiFe/Cu/CoFeB/Ru/CoFeB/PdPtMn multilayer film, or a tunnel junction type MR film (TMR film) such as a NiFe/$Al_2O_3$/NiFe/PdPtMn multilayer film. The plug electrode film 32 is formed of Ta.

Figure 18B:
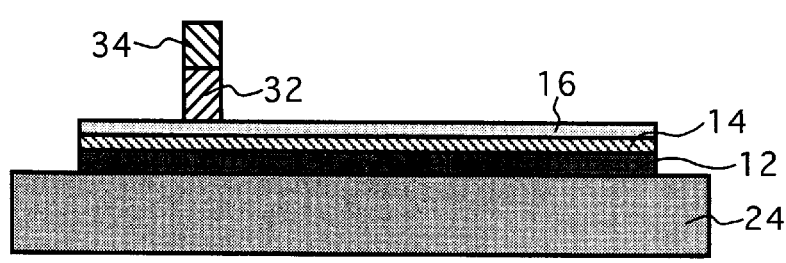
Figure 18C:
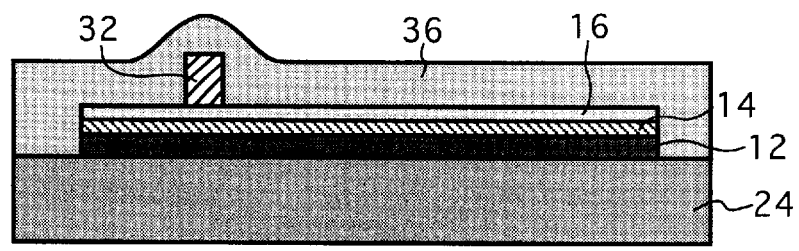
Figure 19A:
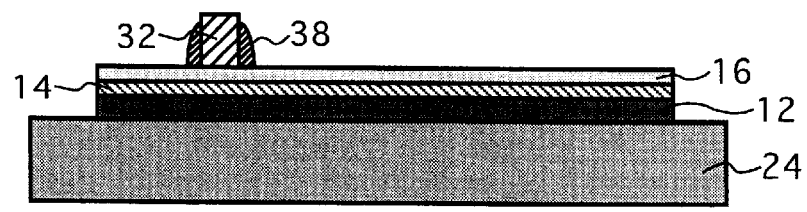
FIGS. 19A to 19C are sectional views showing a manufacturing process for the magnetoresistive head according to the third preferred embodiment.

A photoresist 34 is uniformly applied and patterned to a desired shape. Thereafter, as shown in FIG. 18B, the plug electrode film 32 is etched by using the photoresist 34 as a mask to thereby form the plug electrode film 32 into a desired shape. After removing the photoresist 34, an insulating film 36 of $SiO_2$ or the like having good step coverage is deposited as shown in FIG. 18C. The insulating film 36 is next etched back by isotropic etching to thereby form a first plug side wall protective insulating film 38 having such a shape as to cover the plug electrode 32 as shown in FIG. 19A.

Figure 19B:
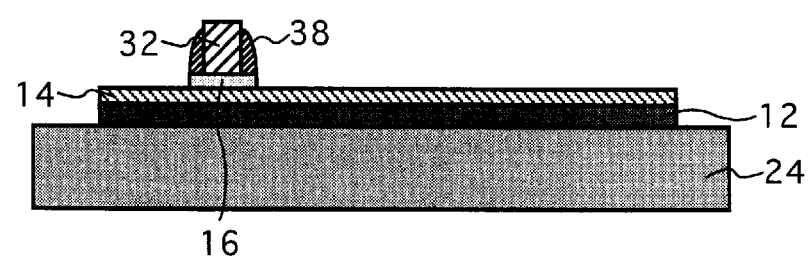
Figure 19C:
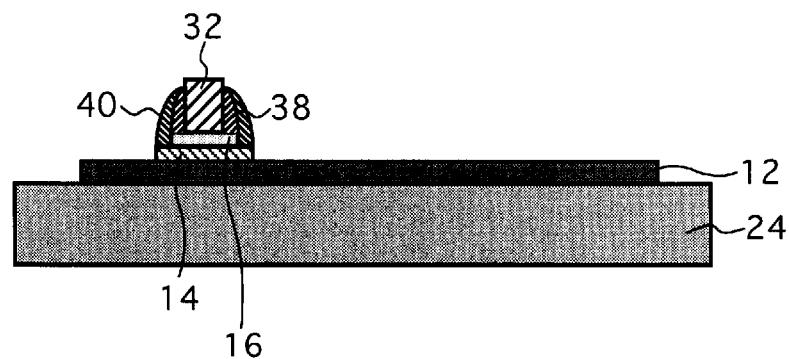

By using the first plug side wall protective insulating film 38 as an etching mask for the upper electrode terminal 16, the upper electrode terminal 16 is etched into a desired shape by first ion milling as shown in FIG. 19B. Thereafter, an insulating film is deposited again and etched back to form a second plug side wall protective insulating film 40. As shown in FIG. 19C, the MR film 14 is etched into a desired shape by second ion milling by using the second plug side wall protective insulating film 40 as a mask.

In the case that the upper electrode terminal 16 and the MR film 14 are similar in shape, the upper electrode terminal 16 and the MR film 14 may be simultaneously etched by the first ion milling, thereby facilitating the process. In the case that the MR film 14 to be etched is large in size, a similar shape may be obtained also by forming a normal resist pattern and next performing ion milling. By such a self-aligned contact forming process, it is possible to independently change the shapes of the upper electrode terminal 16 and the MR film 14 to be formed, and it is also possible to avoid the problem of alignment between the upper electrode terminal 16 and the MR film 14 which are the finest portions of the MR element.

Figure 20A:
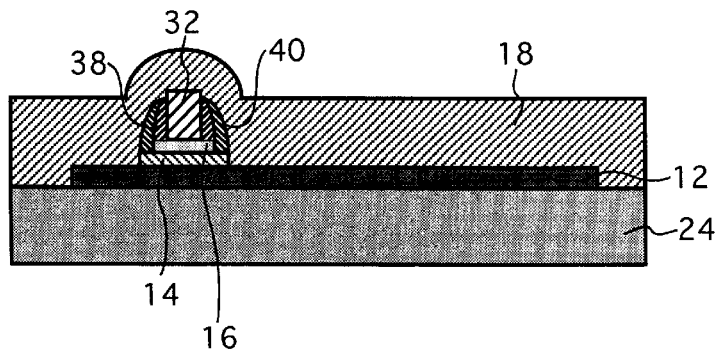
FIGS. 20A to 20C are sectional views showing a manufacturing process for the magnetoresistive head according to the third preferred embodiment.
Figure 20B:
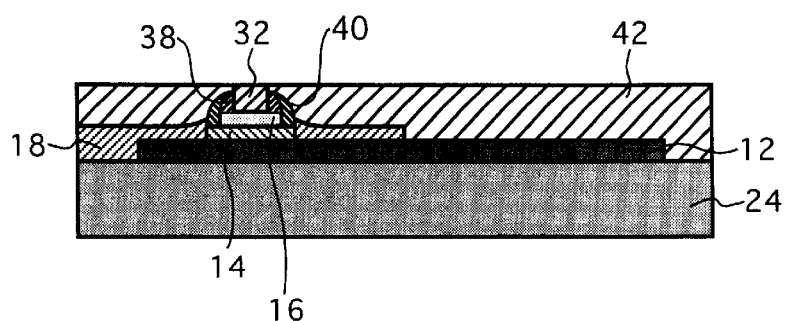

As shown in FIG. 20A, a magnetic domain control film 18 is uniformly deposited. The magnetic domain control film 18 may be provided by a high-coercivity film such as a CoCrPt film or by an antiferromagnetic film such as a PdPtMn film. After forming a photoresist pattern, the magnetic domain control film 18 is etched back by ion milling to obtain a desired shape and thickness of the magnetic domain control film 18. As shown in FIG. 20B, an interlayer insulating film 42 of $SiO_2$ or $Al_2O_3$, for example, is deposited and next planarized by etch-back or chemical mechanical polishing (CMP).

Figure 20C:
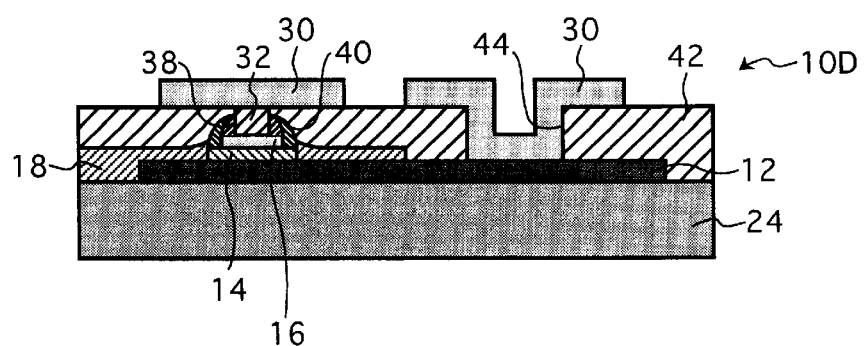

Finally, as shown in FIG. 20C, a through hole 44 for the lower electrode terminal 12 is formed in the interlayer insulating film 42, and an upper magnetic shield 30 of NiFe is formed on the interlayer insulating film 42, thus completing the magnetoresistive head 10D according to the third preferred embodiment. The lower electrode terminal 12 is connected directly to the upper magnetic shield 30 in the through hole 44, and the upper electrode terminal 16 is connected through the plug electrode 32 to the upper magnetic shield 30.

The present invention has the following effects.

(1) The height or width of the lower electrode terminal can be made larger than the height or width of the magnetoresistive film. Accordingly, there is almost no need for alignment of the lower electrode terminal and the upper electrode terminal and for alignment of the lower electrode terminal and the magnetoresistive film, thereby facilitating the fabrication of the magnetoresistive head.

(2) In the case that the height or width of the upper electrode terminal is equal to the height or width of the magnetoresistive film, the upper electrode terminal and the magnetoresistive film can be formed simultaneously, thereby facilitating the fabrication of the magnetoresistive head.

(3) In the case that the height or width of the upper electrode terminal is less than the height or width of the magnetoresistive film, the sectional area of a portion of the magnetoresistive film where a sense current flows can be reduced, thereby obtaining a high reproduction output in view of the characteristics of a CPP structure.

(4) In the case that the height or width of the upper electrode terminal is less than the height or width of the magnetoresistive film, self-alignment can be effected by a process technique such as photoresist shrinkage, so that alignment of the upper electrode terminal and the magnetoresistive film is not required, thereby facilitating the fabrication of the magnetoresistive head.

(5) In the structure that only the upper electrode terminal is smaller than the magnetoresistive film according to the present invention as compared with the conventional structure that both the upper and lower electrode terminals are smaller than the magnetoresistive film, higher current concentration occurs to thereby obtain a higher reproduction output.

(6) In the preferred embodiment wherein the plug electrode and the plug side wall protective insulating film are formed and this insulating film is used as an etching mask for the upper electrode terminal film and the magnetoresistive film, a self-aligned contact fabrication process is performed to thereby eliminate the problem of alignment of the magnetoresistive film and the contact hole. Furthermore, since the upper magnetic shield is connected through the plug electrode to the upper electrode terminal, electrically stable connection can be attained.

(7) Accordingly, a microstructural magnetoresistive head can be manufactured easily at a high yield, and the magnetoresistive head thus manufactured can obtain a high reproduction signal with no Barkhausen noise.

What is claimed is:

1. A magnetoresistive head comprising:
   a first magnetic shield;
   a first electrode terminal provided on said first magnetic shield, said first electrode terminal having a first width;
   a magnetoresistive film provided on said first electrode terminal, said magnetoresistive film having a second width less than or equal to said first width;
   a second electrode terminal provided on said magnetoresistive film, said second electrode terminal having a substantially uniform third width less than or equal to said second width; and
   a second magnetic shield provided on said second electrode terminal.

2. A magnetoresistive head according to claim 1, further comprising a pair of magnetic domain control films provided on the opposite sides of said magnetoresistive film.

3. A magnetoresistive head according to claim 1, further comprising a substrate on which said first magnetic shield is provided.

4. A magnetoresistive head according to claim 1, wherein said magnetoresistive film comprises at least one low-resistance film and at least two ferromagnetic films sandwiching said low-resistance film, the electrical resistance of said magnetoresistive film changing according to an applied magnetic field.

5. A magnetoresistive head according to claim 1, wherein said magnetoresistive film has a ferromagnetic tunnel junction structure, the electrical resistance of said magnetoresistive film changing according to an applied magnetic field.

6. A magnetoresistive head according to claim 1, wherein said magnetoresistive film has a multilayer film structure comprising a ferromagnetic layer and a nonmagnetic layer, the electrical resistance of said magnetoresistive film changing according to an applied magnetic field.

7. A magnetoresistive head according to claim 1, wherein said second width is less than said first width, and said third width is less than said second width.

8. A magnetoresistive head comprising:
a first magnetic shield;
a first electrode terminal provided on said first magnetic shield, said first electrode terminal having a first width;
a magnetoresistive film provided on said first electrode terminal, said magnetoresistive film having a second width less than or equal to said first width;
a second electrode terminal provided on said magnetoresistive film, said second electrode terminal having a third width less than or equal to said second width;
a second magnetic shield provided on said second electrode terminal;
a plug electrode for connecting said second electrode terminal and said second magnetic shield; and
a plug side wall protective insulating film for covering a side wall of said plug electrode.

9. A magnetoresistive head comprising:
a first electrode terminal serving also as a first magnetic shield, said first electrode terminal having a first width;
a magnetoresistive film provided on said first electrode terminal, said magnetoresistive film having a second width less than or equal to said first width;
a second electrode terminal provided on said magnetoresistive film, said second electrode terminal having a substantially uniform third width less than or equal to said second width; and
a second magnetic shield provided on said second electrode terminal.

10. A magnetoresistive head comprising:
a first magnetic shield;
a first electrode terminal provided on said first magnetic shield, said first electrode terminal having a first height;
a magnetoresistive film provided on said first electrode terminal, said magnetoresistive film having a second height less than or equal to said first height;
a second electrode terminal provided on said magnetoresistive film, said second electrode terminal having a substantially uniform third height less than or equal to said second height; and
a second magnetic shield provided on said second electrode terminal.

11. A magnetoresistive head according to claim 10, further comprising a pair of magnetic domain control films provided on the opposite sides of said magnetoresistive film.

12. A magnetoresistive head according to claim 10, further comprising a substrate on which said first magnetic shield is provided.

13. A magnetoresistive head according to claim 10, wherein said magnetoresistive film comprises at least one low-resistance film and at least two ferromagnetic films sandwiching said low-resistance film, the electrical resistance of said magnetoresistive film changing according to an applied magnetic field.

14. A magnetoresistive head according to claim 10, wherein said magnetoresistive film has a ferromagnetic tunnel junction structure, the electrical resistance of said magnetoresistive film changing according to an applied magnetic field.

15. A magnetoresistive head according to claim 10, wherein said magnetoresistive film has a multilayer film structure comprising a ferromagnetic layer and a nonmagnetic layer, the electrical resistance of said magnetoresistive film changing according to an applied magnetic field.

16. A magnetoresistive head according to claim 10, wherein said second height is less than said first height, and said third height is less than said second height.

17. A magnetoresistive head comprising:
a first magnetic shield;
a first electrode terminal provided on said first magnetic shield, said first electrode terminal having a first height;
a magnetoresistive film provided on said first electrode terminal, said magnetoresistive film having a second height less than or equal to said first height;
a second electrode terminal provided on said magnetoresistive film, said second electrode terminal having a third height less than or equal to said second height;
a second magnetic shield provided on said second electrode terminal;
a plug electrode for connecting said second electrode terminal and said second magnetic shield; and
a plug side wall protective insulating film for covering a side wall of said plug electrode.

18. A magnetoresistive head comprising:
a first electrode terminal serving also as a first magnetic shield, said first electrode terminal having a first height;
a magnetoresistive film provided on said first electrode terminal, said magnetoresistive film having a second height less than or equal to said first height;
a second electrode terminal provided on said magnetoresistive film, said second electrode terminal having a substantially uniform third height less than or equal to said second height; and
a second magnetic shield provided on said second electrode terminal.

19. A manufacturing method for a magnetoresistive head, comprising the steps of:
forming a first magnetic shield;
forming a first electrode terminal on said first magnetic shield;
forming a magnetoresistive film on said first electrode terminal;
forming a first film for forming a second electrode terminal on said magnetoresistive film;
forming a second film for forming a plug electrode on said first film;
applying a photoresist to said second film;
patterning said photoresist to a desired shape;
etching said second film by using said patterned photoresist as a mask to form said plug electrode having a desired shape;
removing said patterned photoresist and next depositing a first insulating film on said first film so as to cover said plug electrode;

etching back said first insulating film by isotropic etching to form a first plug side wall protective insulating film for covering said plug electrode;

etching said first film by ion milling by using said first plug side wall protective insulating film as a mask to form said second electrode terminal having a desired shape;

depositing a second insulating film on said magnetoresistive film so as to cover said first plug side wall protective insulating film;

etching back said second insulating film by isotropic etching to form a second plug side wall protective insulating film for covering said first plug side wall protective insulating film; and etching said magnetoresistive film into a desired shape by using said second plug side wall protective insulating film as a mask.

20. A manufacturing method according to claim 19, further comprising the steps of:

depositing a magnetic domain control film on said first electrode terminal so as to cover said second plug side wall protective insulating film after said step of etching said magnetoresistive film;

etching back said magnetic domain control film by ion milling to obtain a desired shape and thickness;

depositing an interlayer insulating film on said first electrode terminal and said magnetic domain control film;

planarizing said interlayer insulating film;

forming a through hole for said first electrode terminal in said interlayer insulating film; and forming a second magnetic shield on said interlayer insulating film so that said second electrode terminal is connected through said plug electrode to said second magnetic shield, and said first electrode terminal is connected directly to said second magnetic shield in said through hole.

21. A manufacturing method according to claim 19, wherein said first electrode terminal has a first width, said magnetoresistive film has a second width less than or equal to said first width, and said second electrode terminal has a third width less than or equal to said second width.

* * * * *